United States Patent [19]

Yanagawa et al.

[11] Patent Number: 4,618,251

[45] Date of Patent: Oct. 21, 1986

[54] RECORDING APPARATUS

[75] Inventors: Hitoshi Yanagawa, Tokyo; Takeshi Nagasawa; Shunzo Inoue, both of Yokohama; Toshio Iwaya, Shiki; Shinji Murata, Tokyo, all of Japan

[73] Assignee: Canon Kabushiki Kaisha, Tokyo, Japan

[21] Appl. No.: 658,072

[22] Filed: Oct. 5, 1984

Related U.S. Application Data

[63] Continuation of Ser. No. 421,736, Sep. 23, 1982, abandoned.

[30] Foreign Application Priority Data

| Oct. 5, 1981 [JP] | Japan | 56-158482 |
| Oct. 5, 1981 [JP] | Japan | 56-158483 |
| Oct. 5, 1981 [JP] | Japan | 56-158484 |

[51] Int. Cl.$^4$ .............................................. G03B 27/52
[52] U.S. Cl. ........................................ 355/28; 355/29; 354/319
[58] Field of Search .................................... 355/27–29; 354/297, 319; 307/590–593, 600, 603

[56] References Cited

U.S. PATENT DOCUMENTS

| 3,557,675 | 1/1971 | Koll et al. | 95/14 |
| 4,136,946 | 1/1979 | Nishimoto | 355/28 |
| 4,272,185 | 6/1981 | Arai et al. | 355/28 |
| 4,344,690 | 8/1982 | Viehrig et al. | 354/319 |
| 4,405,227 | 9/1983 | Inoue et al. | 355/27 |

Primary Examiner—L. T. Hix
Assistant Examiner—Della Rutledge
Attorney, Agent, or Firm—Fitzpatrick, Cella, Harper & Scinto

[57] ABSTRACT

A storage chamber for temporally storing elongate web is provided between exposure device for imagewisely exposing the elongate web and developing device. After the amount of web in the storage chamber has reached a preset amount, the web is fed from the storage chamber to the developing device, and feeding device is stopped when development of the trailing end of the final exposed section on the web has been terminated after the feed of the web to the developing device has been started.

1 Claim, 7 Drawing Figures

RECORDING APPARATUS

This application is a continuation of application Ser. No. 421,736 filed Sept. 23, 1982 now abandoned.

BACKGROUND OF THE INVENTION

1. Field of the Invention

This invention relates to a recording apparatus for imagewisely exposing an elongate web such as photographic film and developing the same.

2. Description of the Prior Art

In a recording apparatus such as a processor camera or the like, it is necessary that the processing after development be effected with the film feed speed maintained substantially constant so that no irregularity of processing may occur to the film. On the other hand, image exposure of the film is usually effected intermittently and in some cases, it is interrupted for a considerably long time and therefore, the film is intermittently fed from the exposure station to the processing station subsequent to the development and, if the exposure interruption time is long, the feed of the film is interrupted for a long time.

In order to adjust such a difference in film feed characteristic between the exposure station and the processing station, it is known to provide a storage chamber between the exposure station and the processing station so that the film exposed to images is temporally stored in the storage chamber. In such a recording apparatus, a development switch for instructing the feed of the film in the storage chamber to the processing station is provided and by depression of this development switch, the feed of the film from the storage chamber to the processing station is started. If the exposure operation is interrupted for a long time after the feed of the film to the processing station has been started, the amount of film in the storage chamber decreases and when the amount of stored film has reached an amount approximate to the minimum amount, the film is automatically cut by a cutter between the exposure station and the processing station or unexposed film is continuously fed (idly fed) from the exposure station to the processing station during the interruption, whereby development of the exposed film is carried out always constantly. However, if the film is cut each time the amount of stored film reaches an amount approximate to the minimum amount, associated images are recorded on separate films and this leads to the disadvantage that these films must be connected together to enable the films to be utilized with a reader or the like after development.

Also, if, during the interruption of the exposure operation, unexposed film is continuously fed from the exposure station to the processing station, the unexposed film will be wastefully consumed and, as the interruption time becomes longer, more of the film is wasted.

Further, the amount of film which can be stored in the storage chamber is limited and therefore, when the amount of stored film reaches the maximum amount, the film may not be fed from the exposure station to the storage chamber. This is because, if the storage chamber stores the film beyond its capacity, the feed of the film will be hindered in the storage chamber or the processing station.

Accordingly, when the amount of stored film reaches the maximum storage capacity, the feed of the film to the processing station is automatically started so as to decrease the amount of film in the storage chamber, whereby the feed of the film from the exposure station to the storage chamber is again made possible.

However, as previously described, the exposure operation is effected intermittently and therefore, if the feed of the film to the processing station is automatically started when the amount of film in the storage chamber has reached the maximum storage capacity, and if the exposure operation is interrupted for a long time without the film being exposed to images during the time that the amount of film in the storage chamber decreases, the amount of film in the storage chamber will finally reach the minimum amount. When the amount of stored film reaches the minimum amount, the unexposed film is drawn out from the exposure station into the storage chamber by the drive force of the film feeding mechanism of the processing station, and the film in the exposure station is idly fed. When the exposure operation is resumed to record an image associated with the previously recorded image when the film is being idly fed, a blank is created between the final exposed section on the previously recorded film and the top exposed section on the film recorded during the resumption. Thus, no problem would occur where there is no necessity of resuming the exposure of the associated image during the idle feed, whereas in a case where it is desired to resume the exposure of the associated image and yet time has been taken in arranging the originals to be recorded or the like, there is a problem that useless blanks are created on the film even if an attempt is made to record a new associated image in continuation to the so far recorded images.

Also, in the recording apparatus of this type, if a loop-like film is stored in such state within the storage chamber for a long time, the film tends to be curled and may clog the path when the film is fed from the storage chamber to the processing station.

SUMMARY OF THE INVENTION

It is an object of the present invention to solve the above-noted problems.

It is another object of the present invention to provide a recording apparatus which reduces wasteful consumption of sheets.

It is still another object of the present invention to provide a recording apparatus in which a sheet is not cut at unnecessary places.

It is yet still another object of the present invention to provide a recording apparatus in which jam of sheets is prevented.

The invention will become fully apparent from the following detailed description thereof taken in conjunction with the accompanying drawings.

DESCRIPTION OF THE PREFERRED EMBODIMENTS

Figure 1:
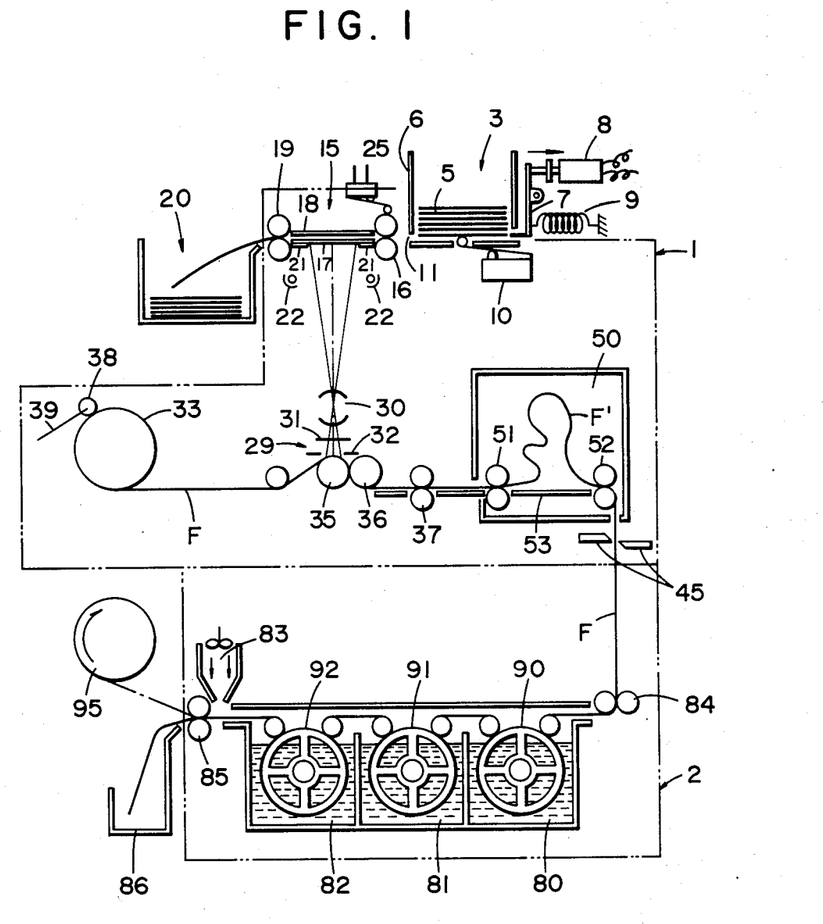
FIG. 1 shows the construction of a processor camera to which the present invention is applied.
Figure 2:
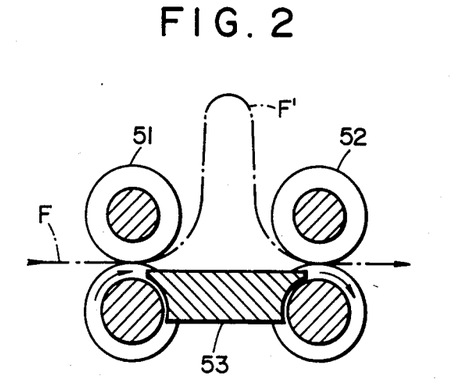
FIG. 2 is a cross-sectional view of film feeding rollers in the storage chamber.

Referring to FIG. 1 which shows a processor camera to which the present invention is applied, reference numeral 1 designates a camera unit for photographing the image of an original on a film, and reference numeral 2 denotes a processor unit for developing or otherwise processing the photographed film. An automatic original supplying device 3 is disposed on the upper part of the camera unit 1 and originals 5 such as checks, bills, stock-certificates, slips, etc. are piled and contained in a container 6. Reference numeral 7 designates a rotatable lever for delivering the originals 5 outwardly of the container, reference numeral 8 denotes an original supplying solenoid for driving the lever 7, and reference numeral 9 designates a spring coupled to the end of the lever 7. When the solenoid 8 of the automatic original supplying device is energized, the lever 7 pivots against the force of the spring 9 and the end thereof strikes against the edge of the lowermost original in the container 6, whereby an original is supplied to a photographing station 15. Designated by 10 is an original detector for detecting the presence or absence of originals in the container 6. The original detector 10 comprises a microswitch which is adapted to be closed and puts out a signal "1" when an original or originals are present in the container.

The original 5 delivered outwardly of the container 6 is fed at a predetermined speed to an illuminating station positioned between two spaced apart flat glass plates 17 and 18 by a pair of feed roller 16 disposed in the photographing station 15, and then is discharged into a tray 20 by a pair of discharge rollers 19.

Of the pair of feed rollers 16, the upper roller is vertically displaceably supported so that, when the original is fed between the pair of feed rollers 16, the upper roller is upwardly displaced by the thickness of the original, and this upward displacement of the roller is detected by an original feed detector 25. This detector 25 comprises a microswitch which is adapted to be closed and put out a signal "1" when the original is fed between the pair of feed rollers 16 and to maintain its closed condition until the trailing end edge of the original passes through the illuminating station.

Referring numeral 21 designates a slit disposed near the illuminating station, and reference numeral 22 denotes a lamp for illuminating the original.

Rollers 16 and 19 are coupled to the drive source (not shown) of the photographing station and, when the original supplying solenoid 8 is energized, these rollers are driven for a predetermined time and feed the original at the same speed with each other.

Reference numeral 30 designates a projection lens, reference numeral 31 denotes a shutter, and reference numeral 32 designates a slit. The original 5 as it passes through the illuminating station is reduction-projected onto a microfilm F disposed in an exposure station 29 by a projection lens 30.

The microfilm F is wound on a supply reel 33 and is fed at a predetermined speed by a capstan roller 35, a pinch roller 36 and a pair of feed rollers 37 disposed in the exposure station 29. The capstan roller 35 and the feed rollers 37 are coupled to the drive source (not shown) of the photographing station and, when the original feed detector 25 is closed, they are driven and feed the film at a speed equal to the speed of movement of the original image on the surface of the capstan roller 35. Accordingly, during photography, the film in the exposure station is fed in synchronism with the feeding of the original.

Reference numeral 38 designates a roller which is in contact with the outer surface of the film wound on the supply reel 33, and reference numeral 39 denotes a pivotable arm supporting the roller 38. These detect the amount of film remaining wound on the supply reel and are designed to produce an alarm signal when the amount of film becomes less than a predetermined amount.

Designated by 45 is a cutter for cutting the film. The cutter 45 is driven by a solenoid (not shown). Denoted by 50 is a storage chamber for storing the film fed from the exposure station freely in the form of a loop. A pair of supply rollers 51 are disposed near the entrance of the storage chamber 50 and a pair of discharge rollers 52 are disposed near the exit of the storage chamber 50. The film exposed in the exposure station is fed into the storage chamber by the supply rollers 51. The film stored in the storage chamber is fed to the processor unit by the discharge rollers 52. A loop F' of the film is formed in the storage chamber due to the difference in film feeding speed between the supply rollers 51 and the discharge rollers 52.

Figures 3, 4:
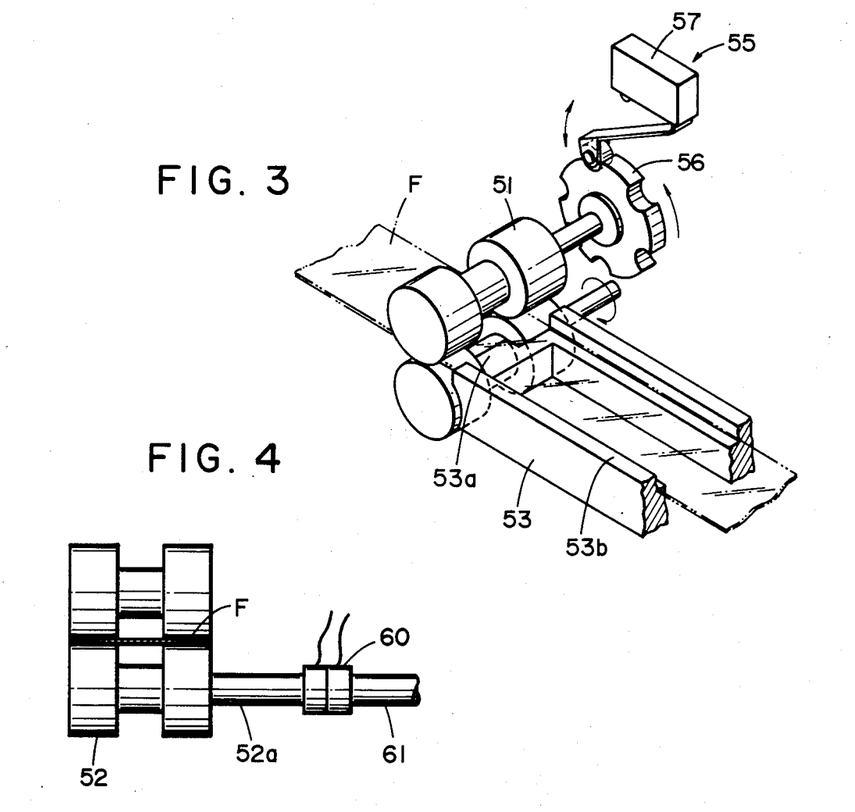
FIG. 3 is a perspective view of a pulse generator.
FIG. 4 shows the construction of discharge rollers.

The supply rollers 51 are coupled to the same drive source to which the capstan roller 35 and the feed roller 37 are coupled, and feed the film at the same speed as these rollers 35 and 37. This pair of supply rollers 51 are of a shape in which, as shown in FIG. 3, the end portions of the rollers are larger in diameter than the central portion of the rollers, and the film F is held between the large-diametered portions of the supply rollers 51. The pair of discharge rollers 52 are similar in shape to the supply rollers 51.

A film guide member 53 is disposed between the supply rollers 51 and the discharge rollers 52. The film guide member 53 has, at the opposite ends thereof, projections 53a disposed near the small-diametered portions of the rollers 51, 52 and movement controlling vertical walls 53b engaged with the side edges of the film. This film guide member 53 serves to guide the leading end edge of the film from the entrance to the exit of the storage chamber when the leading end edge of the film is fed into the entrance of the storage chamber, and to ensure the loop of the film to be formed in such a manner that the film is not laterally deviated between the rollers 51 and 52.

In FIG. 3, reference numeral 55 designates a pulse generator which is operated in response to rotation of the supply rollers 51 and generates a pulse each time the rollers 51 make a predetermined angle of rotation. This pulse generator 55 comprises a cam disc 56 fixed to the shaft of one supply roller 51, and a microswitch 57 closed and opened by projections provided at predetermined intervals on the peripheral surface of the cam disc 56.

In FIG. 1, reference numeral 80 designates a developing device, reference numerals 81 and 82 denote washers, and reference numeral 83 designates a drier. The film F fed from the camera unit 1 into the processor unit 2 is further fed by a driving roller 84, is developed by the developing liquid in the developing device 80, is washed by the washers 81, 82, is dried up by the hot air from the drier 83, and then is discharged into a tray 86 by discharge rollers 85. Feeding drums 90, 91 and 92 are disposed in the liquid tanks of the developing device 80 and the washers 81, 82, respectively, and the film F is wound on each of these drums and automatically fed. The developing liquid in the developing device 80 may be a single bath developing-fixing liquid. The developing process and the fixing process may be effected separately in individual tanks. The driving roller 84, the discharge rollers 85 and the feeding drums 90, 91, 92 are driven by the same drive source (not shown) and feed the film at the same speed.

Designated by 95 is a take-up reel used when the film is taken up without being cut.

The processor unit 2 is provided with a so-called autoloading mechanism for automatically guiding and feeding the film fed from the storage chamber 50.

FIG. 4 shows a driving mechanism for the discharge rollers 52. The shaft 52a of the discharge rollers 52 is drivingly coupled to a drive shaft 61 through an electromagnetic clutch 60. The drive shaft 61 is coupled to the drive source (motor) of the processor unit 2. When the electromagnetic clutch 60 is energized, the shaft 52a and the drive shaft 61 are drivingly coupled together and the discharge rollers 52 feed the film substantially at the same speed as the processor unit 2.

Figure 5:
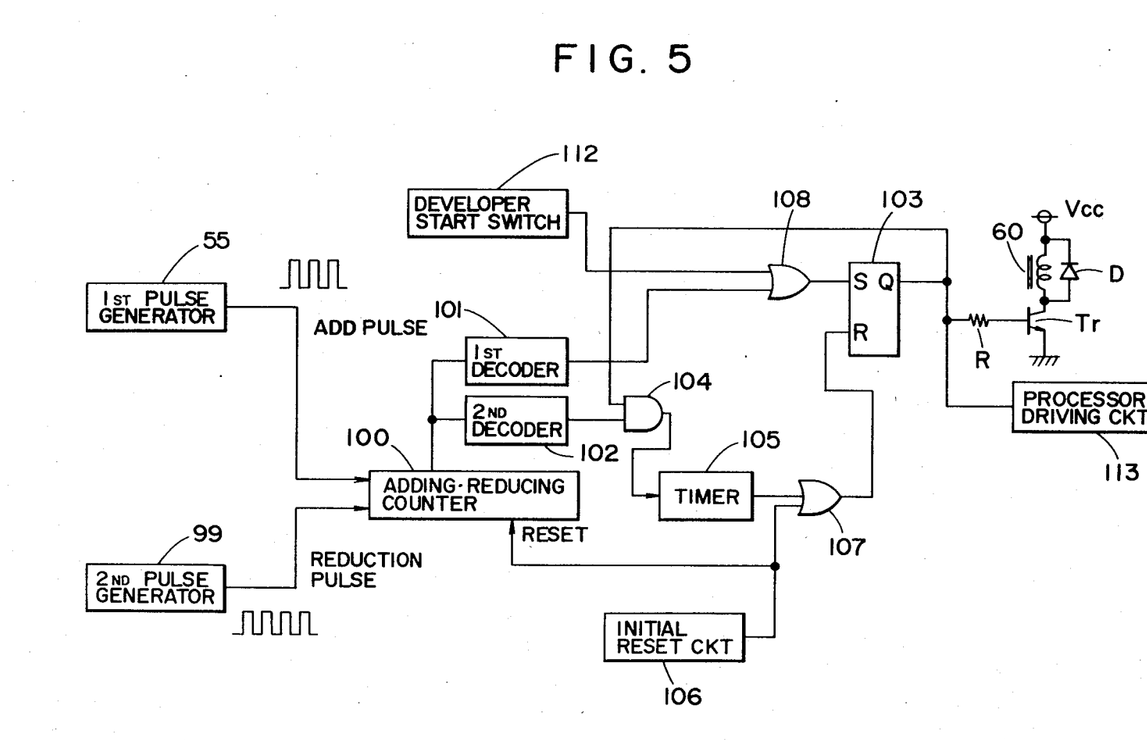
FIG. 5 is a diagram showing the control circuit of a feeding mechanism.

Referring to FIG. 5 which shows the drive control circuit of the discharge rollers and the film feeding mechanism of the processor unit, reference numeral 99 designates the aforementioned second pulse generator for generating a pulse in response to rotation of the discharge rollers. The second pulse generator 99 generates a pulse each time the discharge rollers 52 make a predetermined angle of rotation, that is, each time the film is fed by a predetermined length by rotation of the discharge rollers 52. Designated by 100 is an adding-reducing counter for detecting the amount of film in the storage chamber 50. The adding-reducing counter 100 adds and counts the pulses generated from the aforementioned first pulse generator 55 and reduces and counts the pulses generated from the second pulse generator 99.

Reference numerals 101 and 102 denote a first decoder and a second decoder, respectively. The first decoder 101 puts out a signal "1" when the count of the counter 100 has become a first set value, that is, when a first predetermined amount of film has been stored in the storage chamber. The second decoder 102 puts out a signal "1" when the count of the counter 100 has become a second set value smaller than the first set value, that is, when a second predetermined amount of film has been stored in the storage chamber. In this embodiment, the first predetermined amount is set to an amount of film approximate to the maximum amount which can be stored in the storage chamber, and the second predetermined amount is set to an amount of film approximate to the minimum amount (the condition in which the film has become straight between the rollers 51 and 52). The aforementioned predetermined amounts are not restricted to those of the present embodiment.

Reference numeral 103 designates a flip-flop circuit, reference numeral 104 denotes an AND gate, reference numeral 105 designates a timer for measuring the amount of film being fed, reference numeral 106 designates an initial reset circuit which puts out a signal "1" when the main switch is closed, reference numerals 107 and 108 denote OR gates, reference numeral 112 designates a developer start switch, reference numeral 113 denotes a processor driving circuit for driving the film feeding mechanism such as rollers 84, 85, drums 90, 91, 92, etc. of the processor unit 2, R designates a resistor, Tr denotes a transistor, and D designates a diode. The developer start switch 112 comprises a self-restoration type manually operated switch and when closed, it puts out a signal "1". The timer 105 comprises a conventional timer which operates when the AND gate 104 opens, and puts out a signal "1" when a set time has elapsed after the operation.

The operation of the above-described apparatus will now be described. Before the photographing operation is started, the leading end of the film F is drawn out from the supply reel 33, and is passed between the rollers 35 and 36, and the film is loaded into a condition in which it is nipped between the discharge rollers 52 via the rollers 37 and 51. In this case, the loading is effected in such a manner that a loop of the film is not formed in the storage chamber 50.

After the film is loaded into a condition in which the leading end of the film F is nipped between the discharge rollers 52, the main switch is closed and a bundle of originals is placed into the container 6, whereupon the originals are fed one by one to the photographing station 15. By a signal put out from the initial reset circuit 106 upon closing of the main switch, the flip-flop circuit 103 is reset and the counter 100 is reset to "0". In response to the feed of the original to the photographing station, the rollers 35, 37 and 51 are rotated and the shutter 31 is opened and, in synchronism with the feed of the original, the film F is fed, whereby the original is photographed on the film.

During the photographing operation, the discharge rollers 52 and the rollers 84, 85 and the drums 90, 91, 92 of the processor unit are not rotated, but the rollers 51 are rotated and so, the photographed film is fed into the storage chamber 50 and stored in the form of a loop within the storage chamber 50. The pulses generated from the pulse generator 55 with the rotation of the rollers 51 are added and counted by the counter 100. As the film is fed into the storage chamber, the count of the counter 100 increases and, when it reaches the first set value, the first decoder 101 puts out a signal "1", by which the flip-flop circuit 103 is set. By the flip-flop circuit 103 being set, a signal "1" is put out from the output terminal Q thereof and by this output signal, the rollers 84, 85 and drums 80–81 of the processor unit 2 are rotated through the processor driving circuit 113 and the transistor Tr becomes conductive to energize the electromagnetic clutch 60, whereby the discharge rollers 52 are rotated. Thus, the film in the storage chamber is fed to the processor unit 2, where the film is subjected to the processes such as development, fixation, washing and drying.

On the other hand, with the rotation of the discharge rollers 52, pulses are generated from the second pulse generator 99 and these pulses are reduced and counted by the counter 100. When the photographing operation is interrupted after the feeding of the film from the storage chamber to the processor unit is started, the amount of film in the storage chamber decreases and, when the photographing operation is resumed thereafter, the amount of film in the storage chamber increases. If the photographing operation is interrupted for a long time after the feeding of the film to the processor unit is started, the count of the counter 100 decreases and, when the count reaches the second set value, the second decoder 102 puts out a signal "1", by which the AND gate 104 is opened and the timer 105 is operated. During the operation of the timer 105, the discharge rollers 52, rollers 84, 85 and drums 90–92 continue to rotate, so that by the drive force of these rollers, the film at the photographing station is drawn into the storage chamber and thus, the unexposed film is idly fed from the supply reel 33 into the storage chamber. The idle feeding may be effected by driving the capstan roller 35 and the rollers 37, 51. By this idle feeding, the final exposed section on the film is fed to the storage chamber 50, and then is fed via the developing device 80, washers 81, 82 and drier 83 to the discharge rollers 85 and, when the trailing end of the final exposed section arrives at the discharge rollers 85, the timer 105 puts out a signal "1", by which the flip-flop circuit 103 is reset, whereby the rollers 84, 85 and drums 90–92 are stopped through the processor driving circuit 113 and the electromagnetic clutch 60 is deenergized to stop the discharge rollers 52 and thus, the film stops being fed. When the photographing operation is resumed thereafter, a new original is photographed on the same film.

If the photographing operation is terminated before the first decoder 101 puts out a signal, that is, before the counter 100 assumes the first set value, the developer start switch 112 is operated so as to be closed. When the switch 112 is so operated, it puts out a signal "1", by which the rollers 84, 85 and drums 90–92 are rotated through the processor driving circuit 113 and the electromagnetic clutch 60 is energized to rotate the discharge rollers 52.

Accordingly, the film in the storage chamber is fed to the processor unit 2, where it is subjected to the developing process. The operation thereafter is similar to what has been previously described and, when the trailing end of the final exposed section on the film arrives at the discharge rollers 85, the discharge rollers 52 and the film feeding rollers of the processor unit stop rotating.

The set time of the timer 105 is set to the time required from after the amount of film in the storage chamber 50 decreases and the counter 100 assumes the second set value until the trailing end of the final exposed section on the film is fed to the discharge rollers 85. As the means for measuring the amount of film being fed, a conventional length measuring device may be provided instead of the timer and, by providing such length measuring device, the final exposed section can be accurately fed to a predetermined position even if the film feed speed is varied.

In the above-described embodiment, feeding of the film is stopped when the trailing end of the final exposed section on the film has arrived at the discharge rollers 85, but in the present invention, feeding of the film may be stopped when, for example, the trailing end of the final exposed section has passed through the developing device 80 after the portion of the film up to at least the trailing end of the final exposed section has been subjected to the developing process.

According to the present invention, as described above, feeding of the sheet from the storage chamber to the processor unit is started when the amount of sheet stored in the storage chamber has become the first set value, and feeding of the sheet is stopped when the sheet has been fed by a predetermined length after the amount of sheet stored in the storage chamber has become the second set value smaller than the first set value and therefore, when the exposure operation is interrupted to decrease the amount of stored sheet, the sheet is never cut between the exposure station and the processor unit or during a long time of interruption, a large amount of sheet is never fed from the exposure station to the processor unit to waste the sheet. As a result, even if associated originals are intermittently exposed while the exposure operation is interrupted for a long time, the associated originals can be recorded on one sheet and such one sheet can be preserved for simple utilization with a reader or the like.

The web is not restricted to microfilm, but various types of conventional photosensitive sheets may be used.

Figure 6:
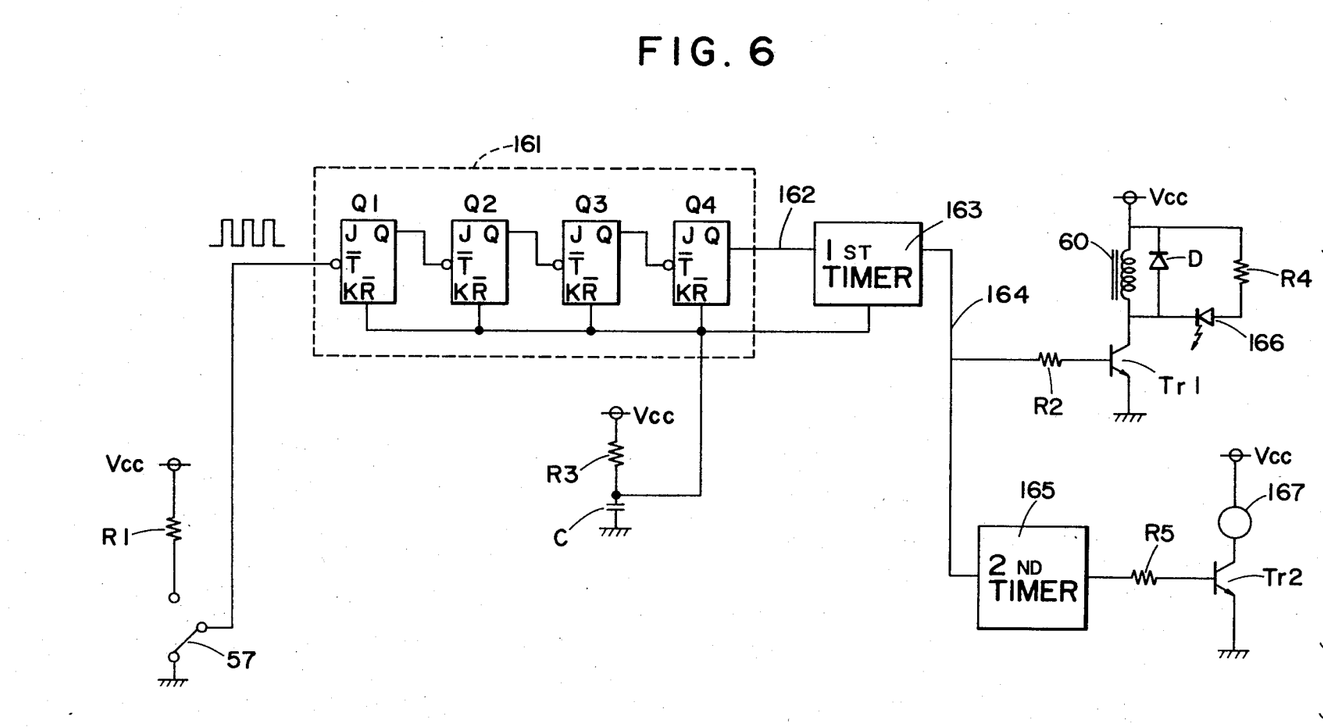
FIGS. 6 and 7 are diagrams showing further embodiments of the control circuit.

FIG. 6 shows another embodiment of the control circuit. In FIG. 6, members or elements similar in construction and function to those of the previous embodiment are given similar reference numerals.

Reference numeral 161 designates a counter for detecting the amount of film in the storage chamber 50. The counter 161 comprises JK flip-flop circuits $Q_1$–$Q_4$ and counts the pulses put out from the microswitch 57 of the pulse generator 55 and, when it has counted a predetermined number of pulses, that is, when the aforementioned first predetermined amount of film has been stored in the storage chamber 50, a signal "1" is put out from the Q output terminal of the flip-flop circuit $Q_4$. In this embodiment, when the counter 161 has counted sixteen pulses, the flip-flop circuit $Q_4$ is set and a signal "1" is put out from an output line 162. Reference numeral 163 designates a first timer operated by the output signal of the counter 161, $R_1$–$R_5$ denote resistors, C designates a capacitor, $Tr_1$ and $Tr_2$ denote transistors, and D designates a diode. Reference numeral 165 designates a second timer, reference numeral 166 denotes a light-emitting diode for display, and reference numeral 167 designates an alarm buzzer. The first timer 163 is operated when the count of the counter 161 has become a set value (16), and a signal "1" is put out from an output line 164 when a set time has elapsed after the operation of the timer 163. The timer 163 can change its set time from outside. The second timer 165 is operated for a set time by the output signal of the first timer 163 and puts out a signal "1" during its operation. The timers 163 and 165 may be conventional ones. The set time of the first timer 163 is set in accordance with the operator's manner of photographing, the procedure, the time required for arranging the originals, the rest period, or the like, but generally it may be set with the maximum of one to two hours as the standard. The resistor $R_3$ and the capacitor C together constitute an initial reset circuit and, when the main switch is closed, the initial reset circuit puts out a signal "1", by which the flip-flop circuit $Q_1$–$Q_4$ and the first timer 163 are reset.

The operation of the above-described apparatus will now be described. Before the photographing operation is started, the leading end of the film F is drawn out from the supply reel 33 and is passed between the rollers 35 and 36, and the film is loaded into a condition in which it is nipped between the discharge rollers 52 via the rollers 37 and 51. In this case, the loading is effected in such a manner that a loop of the film is not formed in the storage chamber 50 (the film between the rollers 51 and 52 becomes straight).

After the film has been loaded into a condition in which the leading end of the film F is nipped between the discharge rollers 52, the main switch is closed and a bundle of originals is placed into the container 6, whereupon the originals are fed one by one to the photographing station 15. In response to the feed of the original to the photographing station, the rollers 35, 37 and 51 are rotated and the shutter 31 is opened, and the film F is fed in synchronism with the feed of the original, whereby the original is photographed on the film.

During the photographing operation, the discharge rollers 52 are not rotated but the rollers 51 are rotated and so, the photographed film is fed into the storage chamber 50 and stored therein in the form of a loop. The pulses generated from the pulse generator 55 with the rotation of the rollers 51 are counted by the counter 161. As the film is fed into the storage chamber, the count of the counter 161 increases and, when it reaches the set value (16), the flip-flop circuit $Q_4$ is set and a signal "1" is put out from an output line 162 and the first timer 163 is operated by this signal. After the set time of the first timer 163 has elapsed, a signal is put out from the timer 163 and by this signal, the transistor $Tr_1$ is rendered conductive and the electromagnetic clutch 60 is energized, whereby the discharge rollers 52 are rotated, so that the film in the storage chamber starts to be fed to the processor unit 2. Simultaneously therewith, the second timer 165 is operated and by the output signal of this timer 165, the transistor $Tr_2$ is rendered conductive to sound the buzzer 167 and thus inform the operator that the feed of the film in the storage chamber to the processor unit has been started. During the time that the electromagnetic clutch 60 is energized, that is, during the time that the film is being fed to the processor unit, the light-emitting diode 166 is turned on to indicate to the operator that the film is being subjected to the developing process.

The first timer 163 can change its set time as desired and can therefore change the timing at which the feed of the film in the storage chamber to the processor unit is started, depending on the operator's manner of working or the amount of originals to be photographed. Accordingly, by adjusting the time of the timer, it is eliminated that unnecessary blanks are created between the associated data on the film as in the prior art. Also, when the feed of the film to the processor unit is started, the operator is informed of it by light or sound, whereby the operator can smoothly effect the preparation or the like for the subsequent photographing.

According to the present invention, as described above, where associated image groups are to be recorded on the sheet while the exposure operation is interrupted, no unnecessary blanks are formed on the sheet even if the exposure operation is interrupted for a long time, and the associated image groups can be continuously recorded on the sheet and the operator can safely carry out the arrangement of originals or the like during the interruption for the preparation for the next recording.

Figure 7:
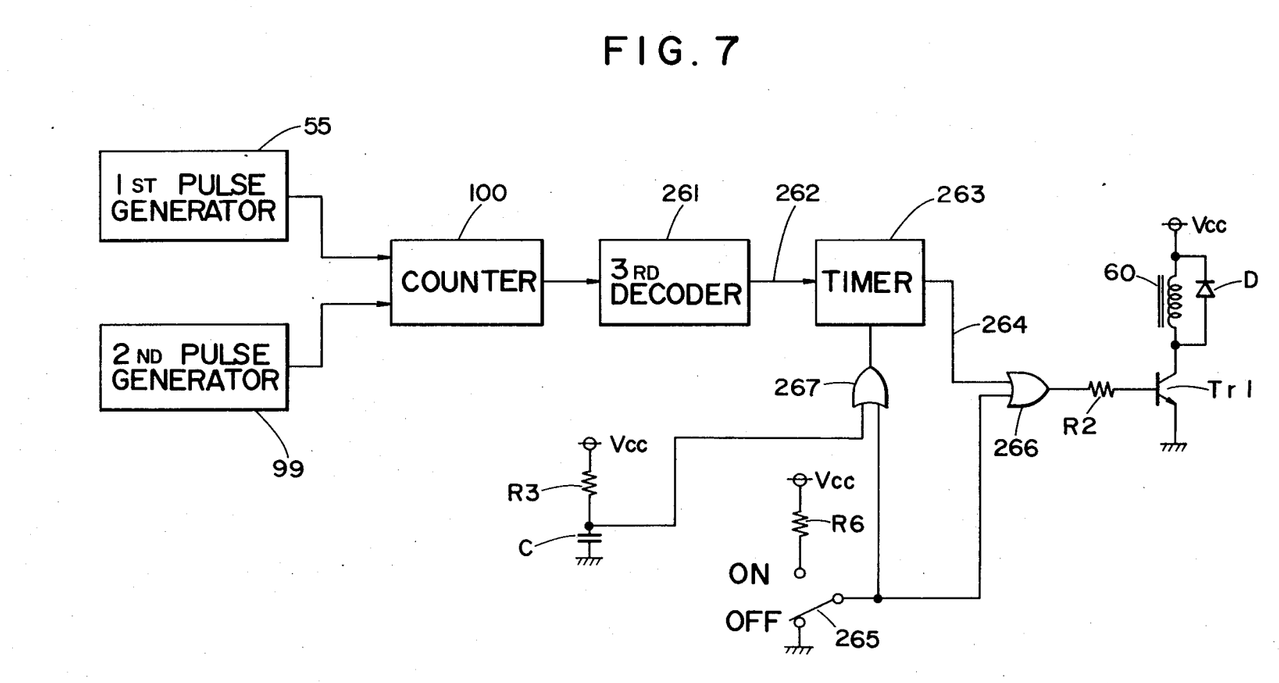

Referring to FIG. 7 which shows still another embodiment of the control circuit, reference numeral 261 designates a third decoder, reference numeral 263 denotes a timer operable by the output signal of the third decoder, reference numeral 265 designates a developer start switch, reference numerals 266 and 267 denote OR gates, and $R_6$ designates a resistor. The developer start switch 265 is a self-restoration type manually operated switch. The timer 263 may be a conventional electrical or mechanical timer or a timer whose set time is variable. The third decoder 261 puts out a signal "1" from its output line 262 when the count of the counter 100 has become the set value. The timer 263 is operated by the signal "1" put out from the third decoder 261 and puts out a signal "1" from its output line 264 when a set time has elapsed after the operation of the timer 263. The third decoder 261 is set so as to put out a signal when a length of film exceeding a certain length has been stored in the form of a loop within the storage chamber 50, and if the condition of such film loop continues for a time longer than the time set by the timer 263, the film in the storage chamber will become steadily curled into a curved shape due to the weight of the film in the form of a loop and therefore, the time of the timer 263 is set to a time in a range in which the film does not tend to be curled. The set time of the timer 263 is set depending on the set amount of film stored in the storage chamber, the type of the film, the shape of the storage chamber and the storage condition, and generally the film hardly tends to be curled even if it is stored in the form of a loop within the storage chamber for several tens of minutes, while the film tends to be curled if it is stored in the form of a loop for a half day or longer and therefore, the time of the timer 263 may be set to several hours.

Also, a signal "1" is put out from the developer start switch 265 when the switch 265 is closed. The timer 263 is reset by a signal put out from the initial reset circuit or a signal put out when the developer start switch 265 is closed.

The operation of the above-described apparatus will now be described. Before the photographing operation is started, the leading end of the film F is drawn out from the supply reel 33 and is passed between the rollers 35 and 36, and the film is loaded into a condition in which it is nipped between the discharge rollers 52 via the rollers 37 and 51. In this case, the loading is effected in such a manner that a loop of the film is not formed in the storage chamber (the film becomes straight between the rollers 51 and 52).

During the photographing operation, the discharge rollers 52 are not rotated but the rollers 51 are rotated, so that the photographed film is fed into the storage chamber 50 and stored therein in the form of a loop. The pulses generated from the pulse generator 55 with the rotation of the rollers 51 are counted by the counter 100. As the film is fed into the storage chamber, the count of the counter 100 increases and, when it reaches the set value, the output line 162 of the third decoder 261 puts out a signal "1", by which the timer 263 is operated. During the operation of the timer, that is, before the timer 263 puts out a signal "1", the photographing operation is terminated and, when the development of the photographed film is to be started, the developer start switch 265 is closed. By this, the electromagnetic clutch 60 is energized to rotate the discharge rollers 52 and the film in the storage chamber 50 is fed to the processor unit 2, where the film is subjected to the developing process. When the developer start switch 265 is closed, the timer 263 is reset. If the developer start switch is not operated during the operation of the timer 263 and the photographing operation is interrupted for a long time, a signal is put out from the timer 263 after lapse of the set time and by this signal, the transistor Tr is rendered conductive and the electromagnetic clutch 60 is energized, whereby the discharge rollers 52 are rotated and the film in the storage chamber starts to be fed to the processor unit 2. Accordingly, the film is fed from the storage chamber to the processor unit before the loop-like film stored in the storage chamber tends to be curled, and thus the film can be prevented from clogging the path.

What is claimed is:

1. A recording apparatus for recording an image on an elongate web comprising:

exposure means for exposing an image on said web;
developing means for developing the exposed web;
a web storage chamber disposed between said exposure means and said developing means for storing in loop form the web fed from said exposure means;
feeding means for feeding the web from said web storage chamber to said developing means;
operating means for initiating operation of said developing means;
timer means arranged for actuation when the amount of web in said web storage chamber has reached a predetermined amount so as to generate a timing signal a predetermined interval after actuation, wherein said timer means is reset to prevent generation of the timing signal if said operating means initiates opertion of said developing means before passage of the predetermined interval; and
control means for controlling said feeding means such that the web in said web storage chamber is fed to said developing means either in response to the initiation of operation of said developing means or in response to the timing signal.

* * * * *

UNITED STATES PATENT AND TRADEMARK OFFICE
CERTIFICATE OF CORRECTION

PATENT NO. : 4,618,251
DATED : October 21, 1986
INVENTOR(S) : HITOSHI YANAGAWA, ET AL.

It is certified that error appears in the above-identified patent and that said Letters Patent is hereby corrected as shown below:

Column 3, line 32, change "roller" to --rollers--;
line 46, change "Referring" to --Reference--.

Column 9, lines 35-36, change "it is eliminated that" to --no--.

Column 12, line 4 (Claim 1, line 18), change "opertion" to --operation--.

Signed and Sealed this

Thirtieth Day of December, 1986

Attest:

DONALD J. QUIGG

*Attesting Officer*  *Commissioner of Patents and Trademarks*